US010098401B2

(12) United States Patent
Weller et al.

(10) Patent No.: US 10,098,401 B2
(45) Date of Patent: Oct. 16, 2018

(54) AUGMENTED REALITY MOTORCYCLE HELMET

(71) Applicant: New Skully, Inc., Wilmington, DE (US)

(72) Inventors: Marcus D. Weller, San Jose, CA (US); Brian Robert Shreeve, San Jose, CA (US); Michael James Roberts, Vancouver, WA (US)

(73) Assignee: New Skully, Inc., Wilmington, DE (US)

( * ) Notice: Subject to any disclaimer, the term of this patent is extended or adjusted under 35 U.S.C. 154(b) by 0 days.

(21) Appl. No.: 14/939,980

(22) Filed: Nov. 12, 2015

(65) Prior Publication Data

US 2016/0066640 A1 Mar. 10, 2016

Related U.S. Application Data

(63) Continuation of application No. 13/897,025, filed on May 17, 2013, now abandoned.
(Continued)

(51) Int. Cl.
*A42B 3/04* (2006.01)
*A42B 3/28* (2006.01)
(Continued)

(52) U.S. Cl.
CPC ............ *A42B 3/042* (2013.01); *A42B 3/0406* (2013.01); *A42B 3/046* (2013.01); *A42B 3/0426* (2013.01);
(Continued)

(58) Field of Classification Search
CPC ..... A42B 3/042; A42B 3/0406; A42B 3/0426; A42B 3/0446; A42B 3/046; A42B 3/0493;
(Continued)

(56) References Cited

U.S. PATENT DOCUMENTS 3,337,845 A  8/1967 Hart
3,391,407 A * 7/1968 Waters .................. A42B 3/286
2/171.3

(Continued)

FOREIGN PATENT DOCUMENTS

DE        200 06 125 U1    12/2000
DE        102005014759 A1  10/2006
KR        20090067415 A     6/2009

*Primary Examiner* — Jameson Collier
(74) *Attorney, Agent, or Firm* — Hill, Kertscher & Wharton; Gregory T. Ourada (57) ABSTRACT

An augmented-reality helmet which in one embodiment is a full-face motorcycle helmet with a look-down micro-display that projects a virtual image in-line with the helmet's chin bar. In order to accommodate the power requirements, the helmet includes a battery pack mounted at the base of the motorcyclist's skull. A wind turbine charges the batteries. Exhaust from the turbine is then deducted through the helmet to cool the battery pack and/or the motorcyclist's head. The turbine is controllable so that it can operate as a circulating fan to provide ventilation. A digital gyroscope provides a control input to a controller for operating a steerable headlight of the motorcycle to track the rider's head movements; and provides acceleration output to an algorithm that will contact emergency responders if the rider is non-responsive after a collision. A 170 degree rear-view camera is mounted within an aerodynamic fairing on the back of the helmet.

4 Claims, 5 Drawing Sheets

Related U.S. Application Data (60) Provisional application No. 61/649,242, filed on May 19, 2012.

(51) Int. Cl.
*A42B 3/30* (2006.01)
*A42B 3/22* (2006.01)
*G06K 9/00* (2006.01)
*G06T 19/00* (2011.01)
*G02B 27/01* (2006.01)

(52) U.S. Cl.
CPC .......... *A42B 3/0446* (2013.01); *A42B 3/0493* (2013.01); *A42B 3/221* (2013.01); *A42B 3/28* (2013.01); *A42B 3/286* (2013.01); *A42B 3/30* (2013.01); *G02B 27/0172* (2013.01); *G02B 27/0176* (2013.01); *G02B 27/0179* (2013.01); *G06K 9/00805* (2013.01); *G06T 19/006* (2013.01); *G02B 2027/0138* (2013.01); *G02B 2027/0159* (2013.01); *G02B 2027/0183* (2013.01)

(58) Field of Classification Search
CPC ........... A42B 3/221; A42B 3/28; A42B 3/286; A42B 3/30; G02B 27/0172; G02B 27/0176; G02B 27/0179; G02B 2027/0138; G02B 2027/0159; G02B 2027/0183; G06K 9/00805; G06T 19/006
USPC .......................... 2/171.3, 410, 422, 424, 425
See application file for complete search history.

(56) References Cited

U.S. PATENT DOCUMENTS

| | | | | |
|---|---|---|---|---|
| 3,813,696 A * | 6/1974 | Yeager | | A42B 3/286 2/171.3 |
| 3,923,370 A | 12/1975 | Mostrom | | |
| 4,483,021 A * | 11/1984 | McCall | | A42B 3/285 2/7 |
| 4,498,202 A * | 2/1985 | Yamamoto | | A42B 3/24 2/171.3 |
| 4,586,197 A | 5/1986 | Hubbard | | |
| 4,757,714 A | 7/1988 | Purdy et al. | | |
| 5,001,786 A | 3/1991 | Copeland | | |
| 5,184,521 A * | 2/1993 | Tyler | | G01C 21/18 248/324 |
| 5,227,819 A * | 7/1993 | Tyler | | G03B 15/006 352/156 |
| 5,251,333 A * | 10/1993 | Tsook | | A42B 3/042 2/6.2 |
| 5,258,785 A | 11/1993 | Dawkins | | |
| 5,266,930 A * | 11/1993 | Ichikawa | | A42B 3/042 345/8 |
| 5,446,506 A | 8/1995 | Dawkins | | |
| 5,537,092 A * | 7/1996 | Suzuki | | A42B 3/042 340/432 |
| 5,608,919 A * | 3/1997 | Case | | A42B 3/04 2/422 |
| 5,646,784 A * | 7/1997 | Wilson | | A42B 3/042 359/14 |
| 5,683,831 A | 11/1997 | Baril et al. | | |
| 5,771,497 A | 6/1998 | Steele | | |
| 6,456,261 B1 | 9/2002 | Zhang | | |
| 6,798,392 B2 * | 9/2004 | Hartwell | | A42B 3/046 345/158 |
| 6,819,354 B1 * | 11/2004 | Foster | | H04N 7/183 348/157 |
| 6,978,162 B2 | 12/2005 | Russell et al. | | |
| 7,046,215 B1 * | 5/2006 | Bartlett | | G01S 5/163 345/8 |
| 7,180,476 B1 | 2/2007 | Guell et al. | | |
| 7,369,174 B2 | 5/2008 | Olita et al. | | |
| 7,729,507 B1 | 6/2010 | Malachowsky | | |
| 7,802,318 B2 * | 9/2010 | Chen | | A42B 3/286 2/171.3 |
| 7,948,367 B1 | 5/2011 | Arauza | | |
| 8,009,229 B1 * | 8/2011 | Peterson | | A42B 3/042 345/8 |
| 8,031,406 B2 | 10/2011 | Chen | | |
| 8,063,934 B2 | 11/2011 | Donato | | |
| 9,247,779 B1 * | 2/2016 | Aloumanis | | G08G 1/137 |
| 9,414,634 B2 * | 8/2016 | Gindin | | G07C 5/0891 |
| 9,445,639 B1 * | 9/2016 | Aloumanis | | A42B 3/0453 |
| 2003/0164841 A1 * | 9/2003 | Myers | | H04N 13/026 345/619 |
| 2004/0143373 A1 * | 7/2004 | Ennis | | B60R 1/00 701/1 |
| 2007/0070069 A1 | 3/2007 | Samarasekera et al. | | |
| 2007/0211348 A1 | 9/2007 | Ashcraft et al. | | |
| 2007/0271687 A1 * | 11/2007 | Zhou | | A42B 3/0426 2/410 |
| 2008/0141442 A1 * | 6/2008 | Chen | | A42B 3/286 2/411 |
| 2008/0239080 A1 * | 10/2008 | Moscato | | A42B 3/0426 348/148 |
| 2008/0309586 A1 | 12/2008 | Vitale | | |
| 2009/0002161 A1 | 1/2009 | Luciani | | |
| 2009/0073330 A1 * | 3/2009 | Viala | | G06Q 10/107 349/11 |
| 2009/0109292 A1 | 4/2009 | Ennis | | |
| 2010/0005572 A1 * | 1/2010 | Chaplin | | A42B 3/285 2/411 |
| 2010/0095439 A1 * | 4/2010 | Nolan | | A42B 3/286 2/421 |
| 2010/0207758 A1 * | 8/2010 | Szeljack | | A42B 3/0453 340/475 |
| 2011/0083241 A1 * | 4/2011 | Cole | | A61F 9/06 2/8.2 |
| 2011/0128350 A1 | 6/2011 | Oliver et al. | | |
| 2011/0231977 A1 | 9/2011 | Rupnick et al. | | |
| 2013/0128046 A1 * | 5/2013 | Gindin | | G07C 5/0891 348/148 |
| 2013/0204930 A1 * | 8/2013 | Hobby | | H04L 65/60 709/203 |
| 2013/0215281 A1 * | 8/2013 | Hobby | | G06F 3/005 348/207.1 |
| 2014/0075655 A1 * | 3/2014 | Ratner | | A42B 3/042 2/422 |
| 2014/0189937 A1 * | 7/2014 | Pietrzak | | A42B 3/042 2/411 |
| 2014/0362244 A1 * | 12/2014 | Martin | | H04N 5/23241 348/211.2 |
| 2015/0130945 A1 * | 5/2015 | Yu | | H04N 7/181 348/158 |
| 2016/0044276 A1 * | 2/2016 | Shearman | | A42B 3/0426 348/207.1 |
| 2016/0110615 A1 * | 4/2016 | Weller | | B60R 1/00 348/115 |
| 2017/0184846 A1 * | 6/2017 | Lu | | G02B 27/017 |
| 2017/0329139 A1 * | 11/2017 | Shearman | | G02B 27/0172 |
| 2018/0103711 A1 * | 4/2018 | Abrahamson | | A42B 3/286 |

* cited by examiner

AUGMENTED REALITY MOTORCYCLE HELMET

RELATED APPLICATIONS

This application is a continuation of U.S. application Ser. No. 13/897,025, entitled "Augmented Reality Motorcycle Helmet", filed May 17, 2013. That application claims the priority benefit of U.S. Provisional Application Ser. No. 61/649,242, entitled "Voice Controlled Heads-Up Display (HUD) Helmet with Networking and Navigation", filed May 19, 2012. The disclosures of which are incorporated by reference herein in their entirety.

BACKGROUND OF THE INVENTION

This invention relates generally to display systems for helmets and in particular for display systems for motorcycle helmets.

Heads-up displays have been suggested for implementation in a multitude of transportation applications including automobiles, aircraft and motorcycles. Heads-up displays typically comprise an image projector, an optical collimator; and a beam splitter (combiner). The beam splitter is typically an angled flat piece of transparent or partially reflective material located directly in front of the viewer. The beam splitter reflects the image from the image projector in such a way that the user is able to see the field of view and the projected image at the same time. The optical collimator focuses the image from the image projector into parallel rays of light so that the user sees a virtual image that appears to be at an infinite distance.

The necessity of having a beam splitter as part of a heads-up display causes little inconvenience in automobiles and aircraft where there is a significant amount of space between the user and the front windscreen of the vehicle within which to mount the beam splitter. For motorcycles, however, installing a beam splitter in the limited space between the rider's face and the helmet windscreen presents significant design obstacles. U.S. Pat. No. 5,537,092 issued to Suzuki et al. suggests simplifying the information displayed to a motorcycle rider (e.g. by using a linear array of LEDs) and projecting it as a virtual image along the base of the visor (partially obstructing the field of view) as a means of overcoming the space limitations inherent in helmet information displays. This approach, however, severely limits the amount of information that can be communicated to the motorcycle rider and results in a reduction of the rider's field of view.

Additionally, as the demand for more and more real-time display of information increases, the processor speed and power consumption necessary to accommodate the demands also increases. In a wireless environment, this dictates the need for larger and heavier batteries in the helmet battery pack, use of tethered batteries and/or powering the helmet with a cable from the vehicle power system. US patent application 2009/0109292 to Ennis for example discloses a video camera system including a heads-up display that is operated from a battery belt pack connected to the camera by a cable. This is not an ideal implementation for a motorcycle helmet since a cable connected between the motorcyclist's helmet and a belt-mounted battery would be cumbersome especially with the exposed cable subjected to windblast at high speeds.

SUMMARY OF THE INVENTION

The present invention comprises a helmet having a battery-operated augmented reality display. According to an illustrative embodiment, the helmet comprises a full-face motorcycle helmet with a look-down micro-display that projects a virtual image in-line with the helmet's chin bar (which is space that is already obstructed from the motorcyclist's field of view.) In order to accommodate the power requirements of the micro-display and associated processor, a battery pack consisting of 4 lithium ion batteries each rated at 2200 mAh for a total capacity of 8800 mAh housed within a crescent-shaped housing that is attached to the rear of helmet at the base of the motorcyclist's skull. This unique battery mounting position puts the center of mass of the helmet as close as possible to the base of the neck so that, despite the mass of the batteries, the helmet provides little inertial resistance to quick movements of the head. In the illustrative embodiment, the helmet includes a wind turbine that operates to charge the batteries when the helmet is exposed to a wind blast of greater than approximately 10 mph. Exhaust from the turbine is then deducted through the helmet to cool the battery pack and/or the motorcyclist's head. The turbine is controllable so that at low speeds and high ambient temperatures the turbine operates as a circulating fan to provide ventilation to cool the motorcyclist's head. The helmet further includes a three axis digital gyroscope mounted to the helmet controller board which (1) provides a control input to a controller for operating a steerable headlight of the motorcycle to track the rider's head movements; and (2) in the event of a rapid deceleration possibly indicating an accident, provides acceleration output to an algorithm that will contact emergency responders if the rider is non-responsive. In the illustrative embodiment, the helmet further comprises a 170 degree rear-view camera mounted within an aerodynamic fairing on the back of the helmet. The rear-view camera eliminates blind spots behind the rider's head while the aerodynamic fairing reduces lift and reduces wind buffeting noise of the helmet.

BRIEF DESCRIPTION OF THE DRAWINGS

The present invention will be better understood from a reading of the following detailed description, taken in conjunction with the accompanying drawing figures in which like references designate like elements and, in which.

DETAILED DESCRIPTION

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 1:
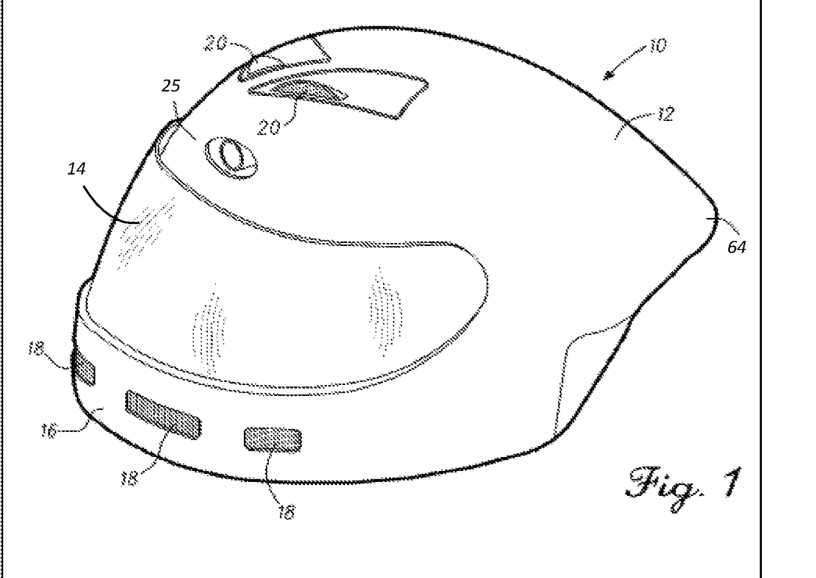
FIG. 1 is a front perspective view of a helmet incorporating features of the present inventions.

With reference to the drawing figures and in particular FIG. 1 there is shown a helmet 10 incorporating features of the present invention. Although helmet 10 is depicted as a motorcycle helmet, a helmet incorporating features of the present invention may be implemented as a bicycle helmet, industrial safety helmet, military or other helmet without departing from the scope of the invention. Helmet 10 is preferably constructed of conventional materials with an inner liner formed of expanded polystyrene (EPS) or polypropylene foam and an outer shell 12 made from a homogeneous plastic such as polyamide, polyethylene or polycarbonate, or from a composite material such as fiberglass, aramid, carbon fiber or other composites.

Helmet 10 includes a conventional face shield 14 and a chin bar 16. Chin bar 16 has a plurality of conventional ventilation intakes 18 which are adjustable to allow a controlled amount of air to enter the helmet for the purpose of reducing fogging of face shield 14 in humid weather and/or for ventilation of the rider. Helmet 10 further includes a plurality of air intakes 20 and a forward-facing camera port 25 the function of which will be discussed more fully hereinafter.

Figure 2:
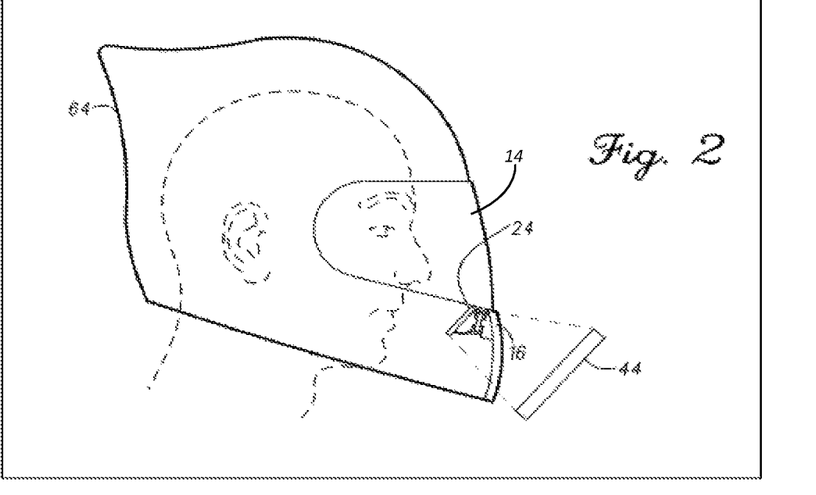
FIG. 2 is a diagrammatic cross section of the helmet of FIG. 1.
Figure 3:
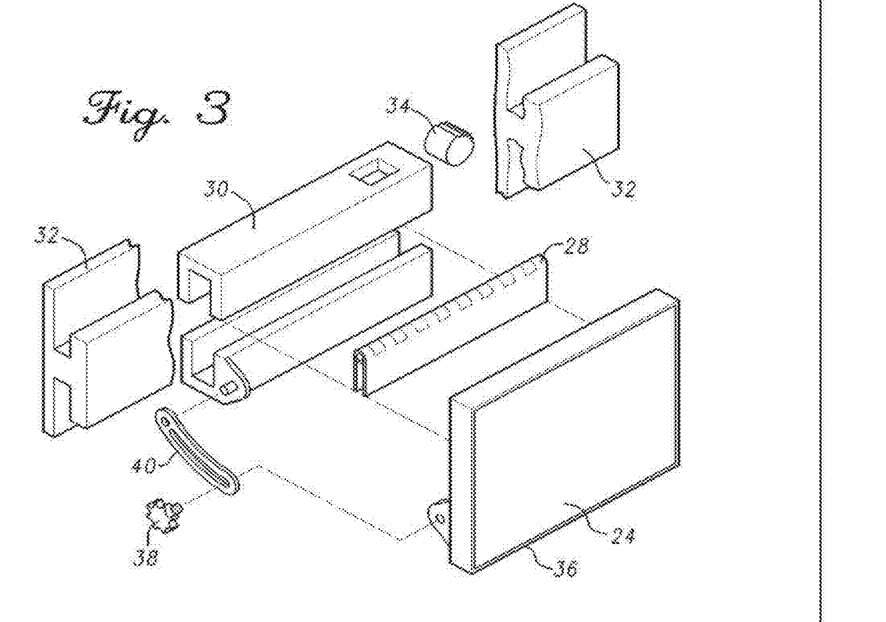
FIG. 3 is an exploded view of a mounting system for the display of the helmet of FIG. 1.

With reference to FIGS. 2 and 3, helmet 10 includes a display device 24 mounted to the rear surface 26 of chin bar 16. Display device 24 preferably comprises a virtual image display (VID) unit consisting of a liquid crystal display (LCD), backlight, collimating optics and magnification optics encased in a single device. In the illustrative embodiment, the VID unit comprises a 0.59" WVGA CyberDisplay™ display unit manufactured by KOPIN CORPORATION of Westboro, Mass. Display device 24 is attached to chin bar 16 by means of a hinge unit 28, attached to a track engaging member 30. Track engaging member 30 engages a horizontal track 32 having a substantially T-shaped cross section which is rigidly attached to rear surface 26 of chin bar 16.

Figure 4:
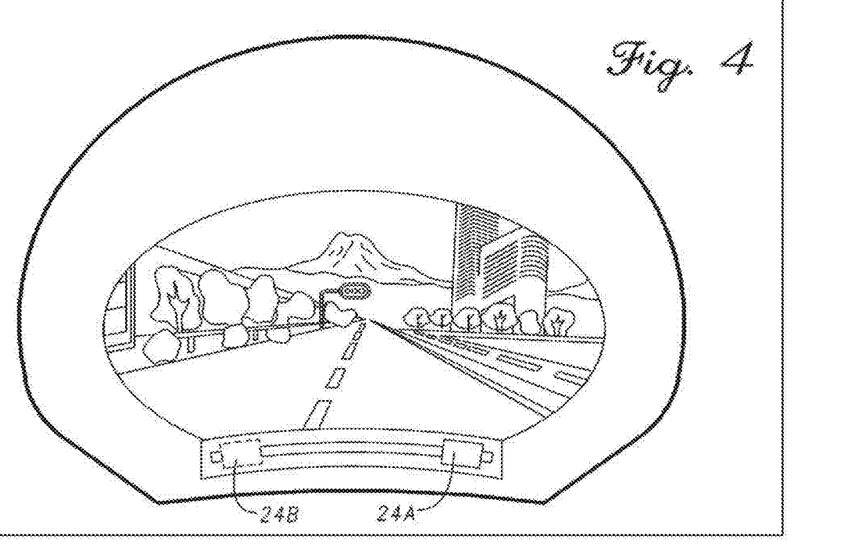
FIG. 4 is a representative view from the perspective of a user wearing the helmet of FIG. 1.

With additional reference to FIG. 4, track engaging member 30 and tack 32 form a sliding mount that enables display device 24 to be moved from the right side position 24A to the left side position 24B of chin bar 16 to accommodate left eye dominant and right eye dominant users. Track engaging member 30 is locked in place along track 32 using a thumb-wheel cam 34 or similar locking mechanism. The tilt angle of display device 24 may be adjusted by moving the lower surface 36 outward as necessary and locking the display device 24 in place using thumbscrew 38 acting on curved bracket 40. Track engaging member 30, track 32 and cam 34 are preferably made of injection-molded plastic such as polyamide, polyethylene or polycarbonate. Hinge unit 28 may be a conventional strap hinge but is preferably a "live" hinge made of homopolymer polypropylene or other suitable plastic material. As shown in FIG. 2, Display device 24 produces a virtual image 44 which appears to the rider to be behind the chin bar 16 at optical infinity. Because the virtual image 44 appears to be behind (i.e. passing through) the chin bar 16, the virtual image 44 appears in an area that is already obscured from the rider's field of view and therefore does not interfere with or reduce the rider's field of view as with prior art helmets. Optionally the virtual image 44 can be positioned at the top edge of the chin guard.

Figure 5:
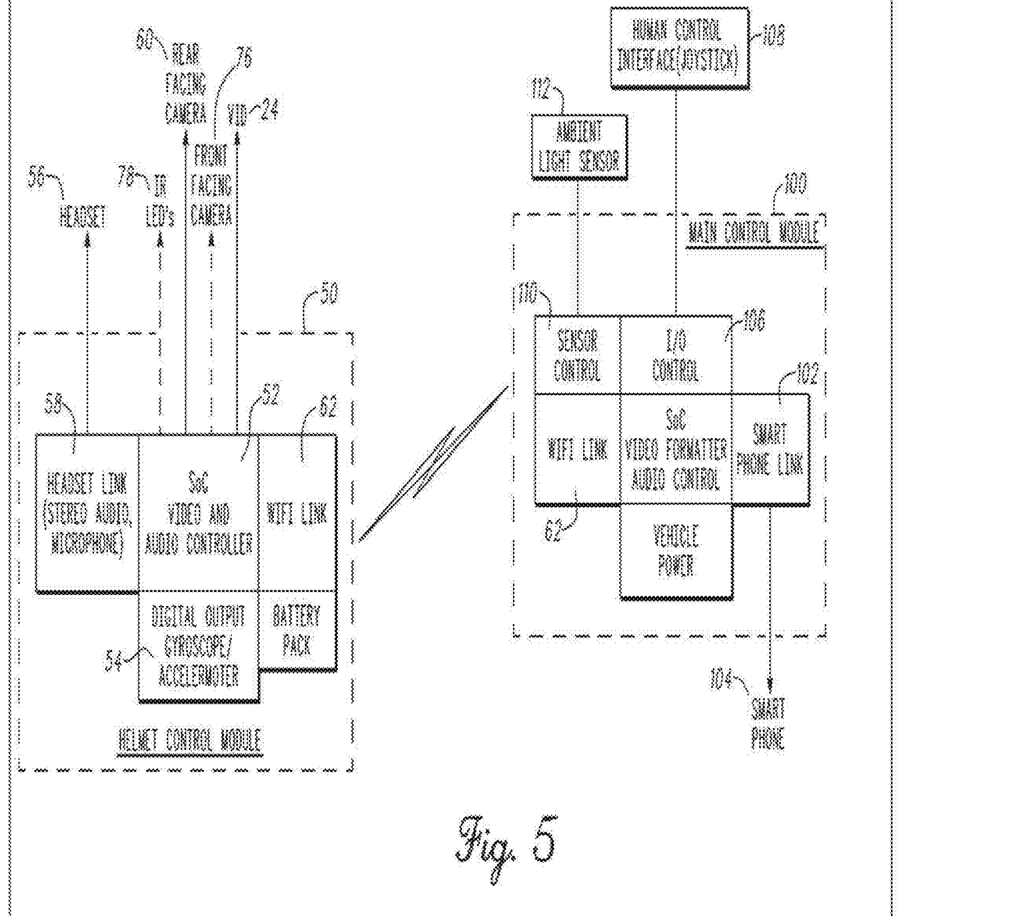
FIG. 5 is a functional block diagram of the electronic modules of the helmet of FIG. 1.

With additional reference to FIG. 5, helmet 10 includes a helmet control module 50 mounted within the interior of outer shell 12. Helmet Control Module (HCM) 50 comprises a System on Chip (SoC) integrated circuit 52 for managing the video and audio I/O, Wi-Fi connection, power management and other functions. HCM 50 may also include a digital output gyroscope/accelerometer 54 the purpose of which is discussed more fully hereinafter. HCM 50 receives video information via a Wi-Fi link 62 which HCM 50 then converts into the appropriate video format for display on display device 24. Although in the illustrative embodiment HCM 50 receives information via Wi-Fi link 62 the invention is not limited to Wi-Fi wireless link. Other wireless communication protocols such as Bluetooth® or other wireless protocols now existing or hereafter developed may be used within the scope of the invention. HCM 50 similarly processes audio information received via Wi-Fi link 62 which is then amplified and played through headset 56 housed within helmet 10. HCM 50 similarly processes voice commands, which may be received via microphone 58 embedded in or otherwise attached to helmet 10. In the illustrative embodiment, System on Chip IC 52 comprises a Broadcomm BCM 2835, Wi-Fi link 62 comprises a TEXAS INSTRUMENTS CC3000, the display driver comprises an INTERSIL TW8835 and the audio amplifier comprises a MAXIM MAX98090.

As noted hereinbefore, HCM 50 includes a gyroscope/accelerometer 54 the purpose of which is twofold. Gyroscope/accelerometer 54 may be used to track the head movements of the rider in order to operate a main or auxiliary headlamp that moves in sync with the rider's head rather than with the front wheel. Additionally, however, gyroscope/accelerometer 54 may be used to provide input to an algorithm that automatically contacts emergency responders in the event of a sudden deceleration (indicative of a possible collision) followed by an absence of movement and/or absence of vocal command. To avoid false positive detection of a collision, an additional sensor such as a proximity sensor and/or thermal sensor is incorporated to determine if the helmet is being worn, or has simply been removed and thrown onto the ground or otherwise discarded. In the illustrative embodiment, gyroscope/accelerometer 54 comprises a MAXIM MAX21000 3-D rate sensor.

Figure 6:
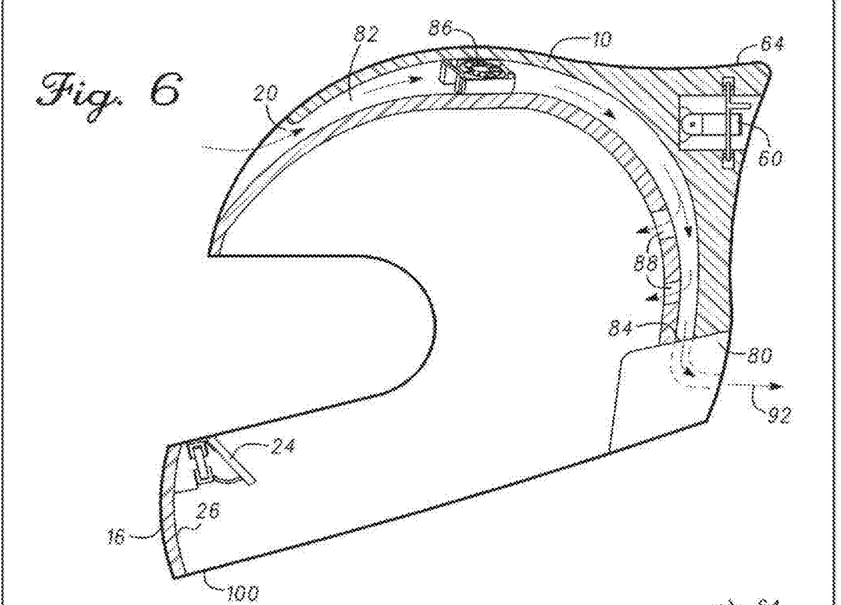
FIG. 6 is a cross section of the helmet of FIG. 1.
Figure 7:
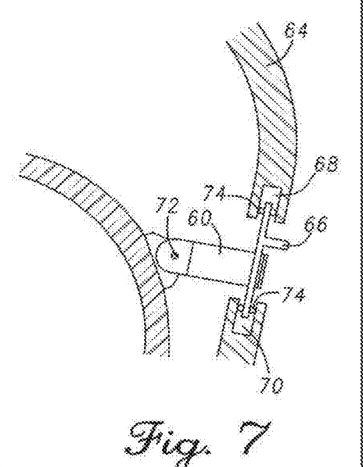
FIG. 7 is a partial cross section of a portion of FIG. 6 showing details of the rearward-facing camera.
Figure 8:
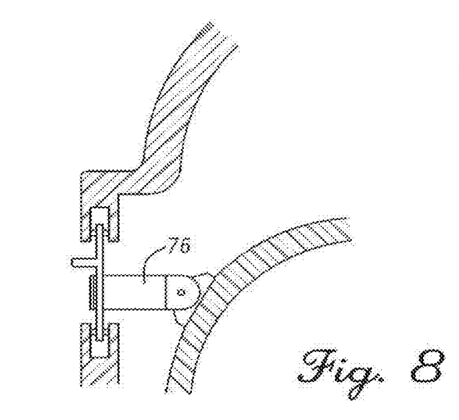
FIG. 8 is a partial cross section showing details of the forward-facing camera.

With additional reference to FIGS. 6-8, helmet 10 is equipped with a rear facing camera 60, preferably having a 150 degree-200 degree, preferably approximately 170 degree field of view. As is known in the art, it is common to equip motorcycle helmets with the rear spoilers in order to reduce lift and/or wind buffeting of the helmet and associated noise at high speed. In the illustrative embodiment, rear-facing camera 60 is mounted within rear spoiler 64 of outer shell 12 thereby utilizing what would otherwise be wasted space. The image from rear-facing camera 60 is processed by HCM 50 and displayed on VID 24 thereby providing the rider with a rear view image, obviating the necessity of the rider to turn his/her head in order to view oncoming traffic. Optionally, rear facing camera 60 may be gyroscopically stabilized using the output from gyroscope/accelerometer 54. An additional chin spoiler 100, preferably formed of a soft polymer material may be attached to chin guard 16 to further reduce wind noise and lift at high speeds. Optionally, chin spoiler 100 may include a microphone and/or additional electronics for operating VID 24 and is removably attached with magnets (e.g. with neodymium or other rare earth permanent magnets) which also act as signal transmitters between chin spoiler 100 and helmet 10).

Macroscopic adjustments of rear-facing camera 60 may be affected by moving lens port 66 upwards and downwards within corresponding apertures 68 and 70 formed in the outer shell 12. Movement of lens port 66 enables rear-facing camera 60 to pivot about a pivot 72. Appropriate seals 74 disposed between lens port 66 and apertures 68, 70 are provided for weatherproofing. Helmet 10 may optionally be equipped with a forward-facing camera 76. The mounting and adjustment of forward-facing camera 76 is identical to the mounting and adjustment of rear-facing camera 60 and therefore will not be discussed in detail herein. Coaxial infrared light emitting diodes 78 are also included to improve visibility in low-light conditions. In the illustrative embodiment rear-facing camera 60 and optional forward-facing camera 76 each comprises an OV7670 Robot Camera Module manufactured by SHENZHEN SHANHAI TECHNOLOGY LTD. of Guangdong, China. Additional sensors, such as scanning LIDAR and radar are used to extend the rider's visual range during night or impaired weather conditions. These sensors are also used to detect objects under all atmospheric conditions so as to warn the rider of a possible impact. The warning may consist of an image displayed on VID 24, a visual warning symbol, as well as an audio signal. The rider will have the option to add full or partial automatic brake control to assist in impact prevention.

Figure 9:
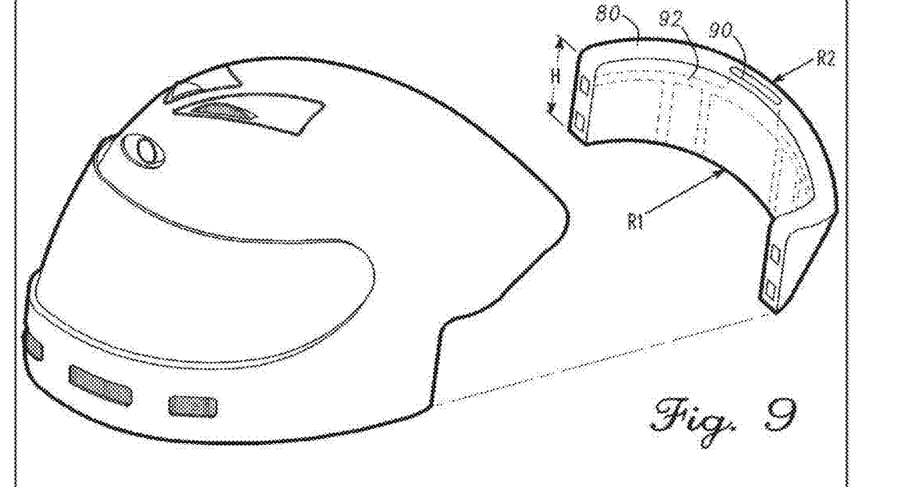
FIG. 9 is a perspective view of the helmet of FIG. 1 with the battery pack removed.

The power requirements of HCM 50 and the other components embedded in helmet 10 necessitates use of a relatively high-capacity battery pack to provide reasonable service life between charges. With additional reference to FIG. 9, in order to minimize the adverse effects of mounting a heavy, high-capacity battery pack, helmet 10 incorporates a battery pack 80 comprising a body having a substantially arcuate profile within inside radius R1 of approximately 65 millimeters and an outside radius R2 of approximately 92 millimeters and a height H of approximately 75 millimeters. The shape of battery pack 80 allows it to fit low and close around the base of the rider's neck extending substantially from ear-to-ear, while the outer surface conforms to the helmet outline. By positioning battery pack 80 low and close around the base of the rider's neck, the moment of inertia of battery pack 80 is minimized relative to the normal turning and tilting motion of the rider's head. Battery pack 80 is replaceable using conventional plug-in connectors and releasable catches. Optionally, helmet 10 includes a barrier wall formed as part of outer shell 12 to isolate battery pack 80 from the rider wearing helmet 10.

Figure 10:
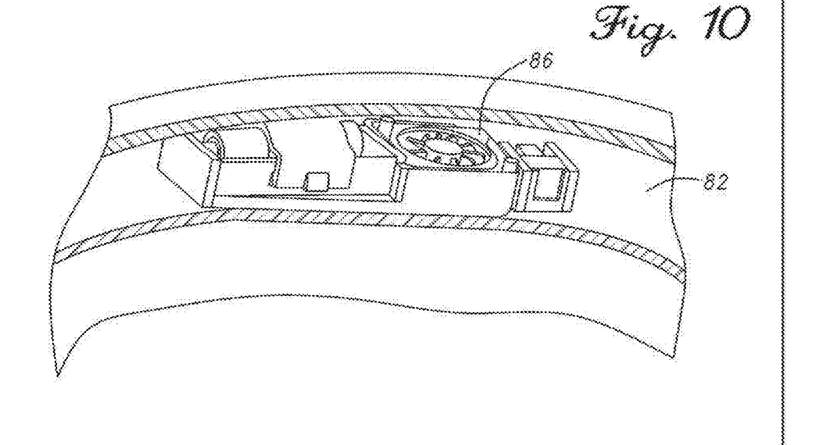
FIG. 10 is an enlarged view of a portion of FIG. 6 showing details of the air-powered generator.

With reference to FIGS. 6 and 10, helmet 10 is equipped with an internal air passageway 82 which leads from air intake 20 to exhaust port 84. Ram-air entering air intake 20 passes through an air-powered electrical generator such as air turbine/generator assembly 86 housed within air passageway 82. Electricity generated by air turbine/generator assembly 86 is used to augment the power supplied by battery pack 80, thereby extending battery life. A portion of the ram-air passing through the air turbine/generator assembly 86 may also be directed to a series of cooling ports 88 to cool the rider's head in warm weather. The remaining portion of the ram-air passing through the air turbine/generator assembly 86 exits exhaust port 84 which is connected to air inlet 90 of battery pack 80. Air entering air inlet 90 is directed through a series of cooling channels 92 formed in battery pack 80 to cool the batteries within battery pack 80 ultimately exiting battery pack 80 via battery pack exhaust port 92. In warm weather and slow speeds, air turbine/generator assembly 86 can be electrically reversed to operate as a circulating fan to cool the rider's head by drawing air through air intake 20 and discharging it through cooling ports 88. A thermal sensor may be incorporated into the helmet to determine when the fan should be switched on to cool the helmet interior.

With reference again to FIG. 5, a main control module (MCM) 100 is a System on Chip integrated circuit provided to control certain functions associated with helmet 10. MCM 100 includes a smart phone link 102 (iOS, Android or other smart phone operating system) to provide GPS navigation, voice and data communication and other functions associated with a smart phone 104. MCM 100 also includes the input output control 106 receiving signals from the manual control interface 108. In the illustrative embodiment, although most commands are contemplated to be voice commands via microphone 58, a manual control interface such as a joy-button or other physically manipulated switch array may be provided as appropriate. MCM 100 further includes a light sensor control 110 which receives signal from an ambient light sensor 112. Light sensor control 110 adjusts the light output of VID 24, determines when infrared LEDs 78 are necessary and performs other functions as necessary based on the ambient light conditions. Light sensor control 110 may also be used to adjust the darkness of face shield 14 to control the ambient light within the helmet. Alternatively face shield 14 itself may have an auto-dark function. MCM 100 also includes a wireless or wired interface with the vehicle engine management system to receive vehicle speed, engine oil pressure, engine temperature, fuel reserve, fuel economy and other vehicle metrics. In the illustrative embodiment, the System on Chip IC comprises a BROADCOMM BCM 2835, the smart phone link comprises a USB to iOS (iPhone) cable and the ambient light sensor comprises a MAXIM MAX44009 light sensor.

Although certain illustrative embodiments and methods have been disclosed herein, it will be apparent from the foregoing disclosure to those skilled in the art that variations and modifications of such embodiments and methods may be made without departing from the invention. For example, although in the illustrative embodiment display device 24 is not a heads-up-display, use of a heads-up display in combination with the other features of the present invention is considered within the scope of the invention. Additionally, although voice commands and/or manual switches are shown in the illustrative embodiment, simple thought commands (e.g. yes/no) detected by EEG are within the scope of the invention as are blink detection commands using an optical eye or eyelid detector. Additional programming functionality may include lockouts that prevent manual input under certain conditions, e.g. speed above a particular threshold, so as to avoid an unsafe condition. Accordingly, it is intended that the invention should be limited only to the extent required by the appended claims and the rules and principles of applicable law. Additionally, as used herein, references to direction such as "up" or "down" are intend to be exemplary and are not considered as limiting the invention and, unless otherwise specifically defined, the terms "generally," "substantially," or "approximately" when used with mathematical concepts or measurements mean within .+−.10 degrees of angle or within 10 percent of the measurement, whichever is greater.

The invention claimed is:

1. A helmet comprising:
    an outer shell;
    an inner shell enclosed within said outer shell such that a cavity is defined between said outer shell and said inner shell;

a gyroscope disposed within said cavity, wherein said gyroscope is adapted to generate a first signal;
a rear-view camera adapted to generate a second signal, the rear-view camera being disposed within said cavity on a pivot, said pivot adapted to move in response to said first signal such that said rear-view camera can be gyroscopically stabilized;
a display disposed within said inner shell, wherein said display is adapted to (i) receive said second signal and (ii) convert said second signal into an image;
at least one air intake and at least one exhaust port disposed in said outer shell;
an internal air passageway located in said cavity in fluid communication with said least one air intake and said at least one exhaust port;
an electrically-reversible turbine contained within said internal air passageway; and
a battery pack disposed within said cavity, the battery pack comprising: one or more batteries; the battery pack further comprising an air inlet being in fluid communication with, and adapted to receive air from, said internal air passageway; and the battery pack further comprising one or more cooling channels in fluid communication with said one or more batteries contained within said battery pack and with said air inlet.

2. The helmet of claim 1, further comprising:
cooling ports disposed in said inner shell that are adapted to receive air from said internal air passageway and discharge said air into said inner shell.

3. The helmet of claim 2, further comprising
a thermal sensor disposed within said inner shell and adapted to generate a third signal, wherein said turbine is configured to direct air through said cooling ports in response to said third signal when a temperature inside said inner shell exceeds a predefined temperature.

4. A helmet comprising:
an outer shell, and an inner shell disposed within said outer shell such that a cavity is defined between said outer shell and said inner shell;
at least one air intake and at least one exhaust port that are each disposed on a surface of said outer shell;
an internal air passageway located inside said cavity, wherein said internal air passageway is in fluid communication with, and adapted to receive air from, said at least one air intake, and further adapted to discharge said air through said at least one exhaust port;
an electrically-reversible turbine enclosed inside said internal air passageway; and
a battery pack comprising: one or more batteries; the battery pack further comprising an air inlet being in fluid communication with, and adapted to receive air from, said internal air passageway; and the battery pack further comprising one or more cooling channels in fluid communication with said air inlet and with said one or more batteries contained within said battery pack.

* * * * *